Dec. 19, 1939.  P. F. MEYER  2,184,244

BICYCLE

Filed Aug. 30, 1938

Inventor:
Paul F. Meyer
By David Manly Helbn
Attorney.

Patented Dec. 19, 1939

2,184,244

UNITED STATES PATENT OFFICE 2,184,244

BICYCLE

Paul F. Meyer, Gary, Ind.

Application August 30, 1938, Serial No. 227,499

4 Claims. (Cl. 280—257)

This invention relates to bicycles and has for its primary object the provision of a structure which will make a bicycle safer, and provides a safety feature enabling the rider to step on and off almost instantaneously in order to avoid possible accidents.

Another feature of this invention is the provision of a transmission placed rearward so that in no way will it interfere with the operation of propelling the bicycle forward.

A still further object of the invention is the provision of a practical, durable, simple construction which is also cheap to manufacture in quantity production.

Other objects of my invention will appear as the description proceeds. To the accomplishment of the foregoing and related ends said invention, then, consists of the means hereinafter fully described and particularly pointed out in the claims.

The annexed drawing and the following description set forth in detail certain structure embodying the invention, such disclosed means constituting, however, but one of the various structural forms in which the principle of the invention may be used. In the accompanying drawing.

Figure 1:
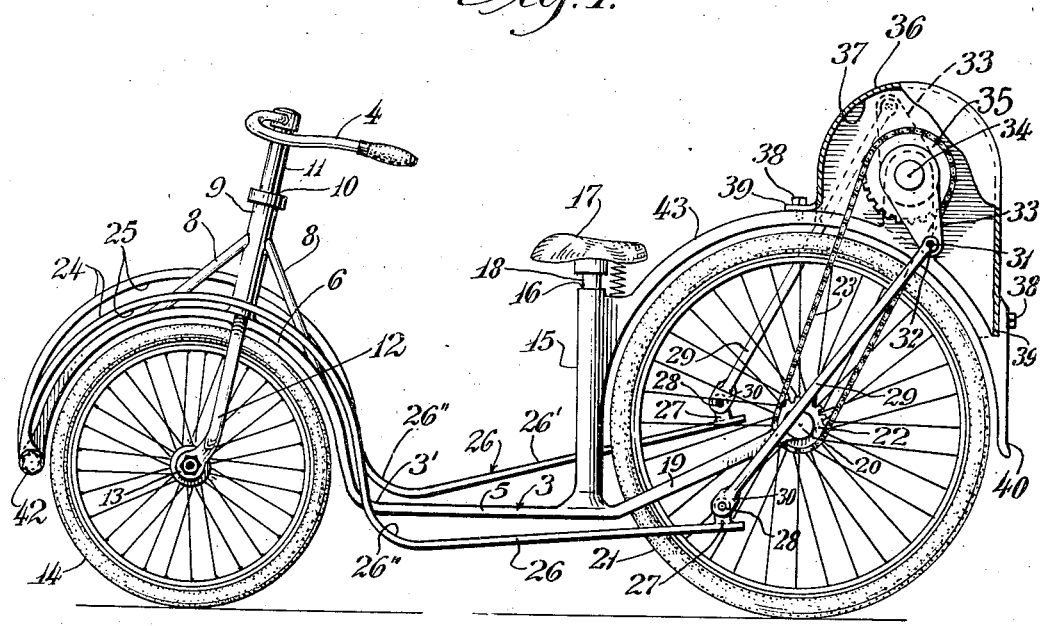
Fig. 1 represents a front elevational view of my bicycle with the transmission head partly in cross-section, its cover broken away so as to disclose the mechanism therein.
Figure 2:
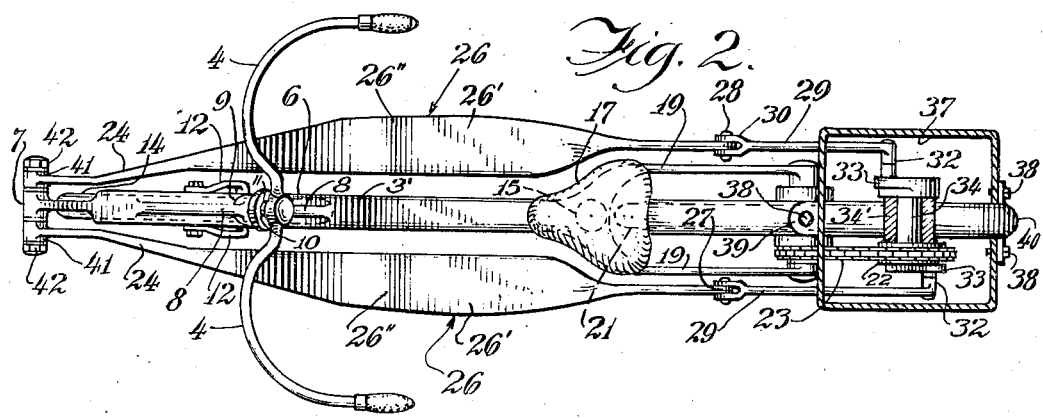
Fig. 2 is a top plan view of the invention as illustrated in Figure 1, showing a transversal cross-section of the transmission head.

By referring to Figure 1, I show that my invention is comprised of a frame work generally designated by the numeral 5 which frame work is provided with a main support 3 as shown on the drawing. This support 3 is straight and is bent at the point 3′ where it is formed into an inverted arcuate or semi-circular shape, designated by the numeral 6 terminating in a bearing portion designated by the numeral 7.

To the outer portion of the semi-circular structure 6 is attached a tubular portion designated by the numeral 9 and suitably braced by the braces designated by the numeral 8 in order to firmly hold it and securely attach it to the aforementioned semi-circular section 6. The portion designated 9 has a hole 10 adapted to receive the shank 11 of the handle bars designated by the numeral 4.

The shank portion 11 terminates in a bifurcated arrangement designated by the numeral 12 which is common and conventional construction used for bicycle wheel bearings, in order to hold the bicycle wheel 14 by virtue of bearings 13.

The frame work 5 toward the rear wheel position has a standard designated by the numeral 15. This standard 15 is suitably drilled with a hole 16 to receive the extension 18 of the bicycle seat designated by the numeral 17. This upright 15 on its upper end has cast integrally therewith the wheel guard 43 which is semi-circular in shape and terminates as at 40 which portion acts as a mud guard.

At the lower end of the column 15 the main frame work 3 has an angular extension 19 which is bifurcated terminating in two bearings designated by the numeral 20 for supporting the rear wheel 21 of the bicycle. The rear wheel is provided with a sprocket designated by the numeral 22.

The transmission housing comprises the circular portion 36, the bicycle frame work designated by the numeral 43 being suitably drilled as shown in order to secure the housing 36 by virtue of screws 38 attaching the lugs 39.

The cover designated by the numeral 36, as can be seen, is recessed suitably as indicated at 37 and said recess provides free movement and action to the parts enclosed therein and which will be later described.

The portion designated 36 is preferably semi-circular at the top and has three flange portions designated by 39 which are suitably drilled in order to receive the screws 38 for which the body portion 43 is suitably tapped in order to hold this gear guard in position. The bearing 34′ is cast integral with the portion 43 of the bicycle frame work. The bearing 34′ supports this lever 34 which has two extensions designated by the numeral 33 which extensions and main hub portion are connected permanently to the sprocket designated by the numeral 35.

The said sprocket 35 is connected to the sprocket 22 heretofore mentioned by the sprocket chain 23 so that when the sprocket 35 is rotated it in turn will impart rotation to the sprocket 22 connected to the wheel member 14 of the bicycle thus providing motion.

In order to impart motion to the sprocket 35 the extensions 33 of the lever 34, heretofore mentioned, are connected to rods 29 by means of their bearing ends 31 and studs 32. At their opposite ends the rods 29 are connected thru their bearings 30 and studs 28 to the bearings 27 which are provided on the members 26. The members 26 are preferably straight and have flat portions 26' which are for the purpose of enabling the feet of the rider to engage conveniently and without difficulty, and each has a sufficiently broad surface to enable the rider to place his feet at almost any point where he finds it most convenient.

The members 26 are bent at 26'' as shown and are further bent to an inverted arcuately shaped structure designated by the numeral 24, the radius 25 of the structure so made that it will not in any way interfere with or contact the tire portion of the wheel 14, and provide ample clearance when the said member 26 is moved up and down by the rider.

The arcuate portion 24 terminates in a bearing 41 which is connected to the bearing 7 heretofore mentioned by virtue of a stud 42 and a suitable lock nut. It can be seen that the arrangement as indicated and shown comprises a means of motion the operation being as follows:

A rider will sit on the bicycle seat designated by 17, rest his feet on the portion 26' and grab the handle bars designated by the numeral 4 so as to support and steady his position on the bicycle. Then he will push on the upper treadle 26 downward which will produce rotation propelling the wheel in a forward manner, in like manner when the upper treadle 26 has been moved to its most downward position by virtue of the crank arrangement heretofore described and designated 33, the other treadle 26 will have moved simultaneously to an upward position and by alternately pressing on the upper treadle the bicycle will have motion imparted to it by virtue of the transmission heretofore described and the traction of the wheel 14 with the ground.

It can be seen that I have provided a novel arrangement for producing the results intended and altho I have shown a preferred embodiment thereof it can be seen that my idea or my invention is susceptible of many modifications, changes, or alterations, and I reserve the right to all such changes as may come within the scope of my invention and the purview of the subjoined claims.

Having thus described my invention what I claim as new and desire to secure by Letters Patent is:

1. In a bicycle, in combination with a bicycle frame-work provided with front and rear transmission bearing supports, a transmission unit placed rearward of the bicycle seat comprising, a lever having two extensions 180° apart journalled in the rear bearing support of the said frame-work, a driving sprocket secured integrally to said lever, two treadle members having front bearing portions articulately secured to the front transmission bearing support of the said bicycle frame-work, said treadle members also provided with rear bearing portions, intermediate link means articulately connected to the extensions of said lever and to the rear bearing portions of said treadle members, and a suitable length of sprocket chain connecting said driving sprocket to a driven sprocket integrally mounted on the rear wheel of the bicycle.

2. In a bicycle, in combination with a transmission unit, a handle bar structure, treadle means and intermediate link means, a bicycle frame-work comprising, a base portion having an arcuately shaped front portion provided with a bearing adapted to secure articulately said treadle means, and bearing means mounted on top of said arcuate front portion adapted to hold swivellably the said handle bar structure, said frame-work also provided with a bifurcated rear portion terminating in bearing portions adapted to secure rotatably the rear wheel of the bicycle, an upright bicycle seat support located intermediately between the front arcuate portion and the rear bifurcated portion of said frame-work, the said frame-work provided with a rear arcuate portion having a bearing adapted to hold rotatably the said transmission unit.

3. A bicycle comprising, in combination, a frame-work provided with a base portion terminating in an arcuate front portion and a bifurcated rear portion, the said arcuate front portion provided with a bearing at its foremost point and an upright bearing extension at its top, a bifurcated handle bar member journalled in the said upright bearing extension and adapted to hold rotatably the front wheel of the bicycle, treadle means articulately secured to the front bearing portion of the said frame-work and provided with rear bearing portions, the said frame-work provided with an upright bicycle seat support located intermediately between said front arcuate portion and the said rear bifurcated portion, and further provided with a rear arcuate portion connected to the said bicycle seat support, the said rear arcuate portion provided with a crank bearing support, a double crank lever mounted rotatably in said crank bearing support, a driving sprocket integrally mounted on said crank lever, intermediate link means, one end of said link means articulately secured to the said crank lever, the other end articulately secured to the rear bearing portions of the said treadle means, a rear wheel rotatably secured in the bifurcated rear portion of said frame-work, a driven sprocket integrally secured to said rear bicycle wheel, and a suitable length of endless sprocket chain meshing with the said driving and driven sprockets.

4. A bicycle comprising, in combination, a frame-work provided with a base portion terminating in an arcuate front portion and a bifurcated rear portion, the said arcuate front portion provided with a bearing at its foremost point and an upright bearing extension at its top, a bifurcated handle bar member journalled in the said upright bearing extension and adapted to hold rotatably the front wheel of the bicycle, treadle means provided with an arcuate front portion articulately secured to the front bearing portion of the said frame-work and provided with rear bearing portions, the said frame-work provided with an upright bicycle seat support located intermediately between the front arcuate portion and the said rear bifurcated portion, and further provided with a rear arcuate portion connected to the said bicycle seat support, the said rear arcuate portion provided with a crank bearing support, a double crank lever mounted rotatably in said crank bearing support, a driving sprocket integrally mounted on said crank lever, intermediate link means, one end of said link means articulately secured to the said crank lever, the other end articulately secured to the rear bearing portions of the said treadle means, a rear wheel rotatably secured in the bifurcated rear portion of said frame-work, a diven sprocket integrally secured to said rear bicycle wheel, and a suitable length of endless sprocket chain meshing with the said driving and driven sprockets.

PAUL F. MEYER.